(12) United States Patent
Miquee et al.

(10) Patent No.: US 10,528,402 B2
(45) Date of Patent: Jan. 7, 2020

(54) ARCHITECTURE FOR CORRELATING EVENTS FOR SUPERCOMPUTER SURVEILLANCE

(71) Applicant: BULL, Les Clayes sous Bois (FR)

(72) Inventors: Sebastien Miquee, Arpajon (FR); Matthieu Perotin, Paris (FR)

(73) Assignee: BULL, Les Clayes-sous-Bois (FR)

( * ) Notice: Subject to any disclaimer, the term of this patent is extended or adjusted under 35 U.S.C. 154(b) by 0 days.

(21) Appl. No.: 15/311,576

(22) PCT Filed: May 12, 2015

(86) PCT No.: PCT/EP2015/060531
§ 371 (c)(1),
(2) Date: Nov. 16, 2016

(87) PCT Pub. No.: WO2015/173274
PCT Pub. Date: Nov. 19, 2015

(65) Prior Publication Data
US 2017/0091000 A1    Mar. 30, 2017

(30) Foreign Application Priority Data
May 16, 2014    (FR) ...................................... 14 54397

(51) Int. Cl.
*G06F 9/54*       (2006.01)
*G06F 11/30*      (2006.01)
*G06F 11/32*      (2006.01)

(52) U.S. Cl.
CPC .......... *G06F 9/542* (2013.01); *G06F 11/3024* (2013.01); *G06F 11/327* (2013.01)

(58) Field of Classification Search
CPC .................................. G06F 9/54; G06F 9/542
See application file for complete search history.

(56) References Cited

U.S. PATENT DOCUMENTS

| | | | |
|---|---|---|---|
| 2004/0137915 A1* | 7/2004 | Diener | H04L 41/0896 455/456.1 |
| 2004/0144927 A1* | 7/2004 | Auner | G01T 1/2928 250/370.11 |
| 2008/0088436 A1* | 4/2008 | Reeves | A61B 5/0031 340/539.12 |
| 2008/0263215 A1* | 10/2008 | Schnellbaecher | H04L 63/0281 709/229 |
| 2008/0281607 A1* | 11/2008 | Sajja | G06Q 10/06 705/1.1 |

(Continued)

*Primary Examiner* — Tuan C Dao
(74) *Attorney, Agent, or Firm* — Flener IP & Business Law; Zareefa B. Flener

(57) ABSTRACT

The invention relates to a method for managing a supercomputer (SC) comprising a set of components (C1, C2, C3 . . . C6) comprising a step of generating notifications (N) by sensors associated with said components; a step of processing said notifications by a hierarchy of modules, said notifications forming incoming events for the modules of lower hierarchical level of said hierarchy, and each module comprising at least one correlation engine for correlating incoming events and generating outgoing events transmitted to the modules of higher level within said hierarchy as incoming events; a step of generating alarms (A), on the basis of the outgoing events generated by the modules of higher hierarchical level within said hierarchy.

12 Claims, 2 Drawing Sheets

(56) References Cited

U.S. PATENT DOCUMENTS

Figure 1:
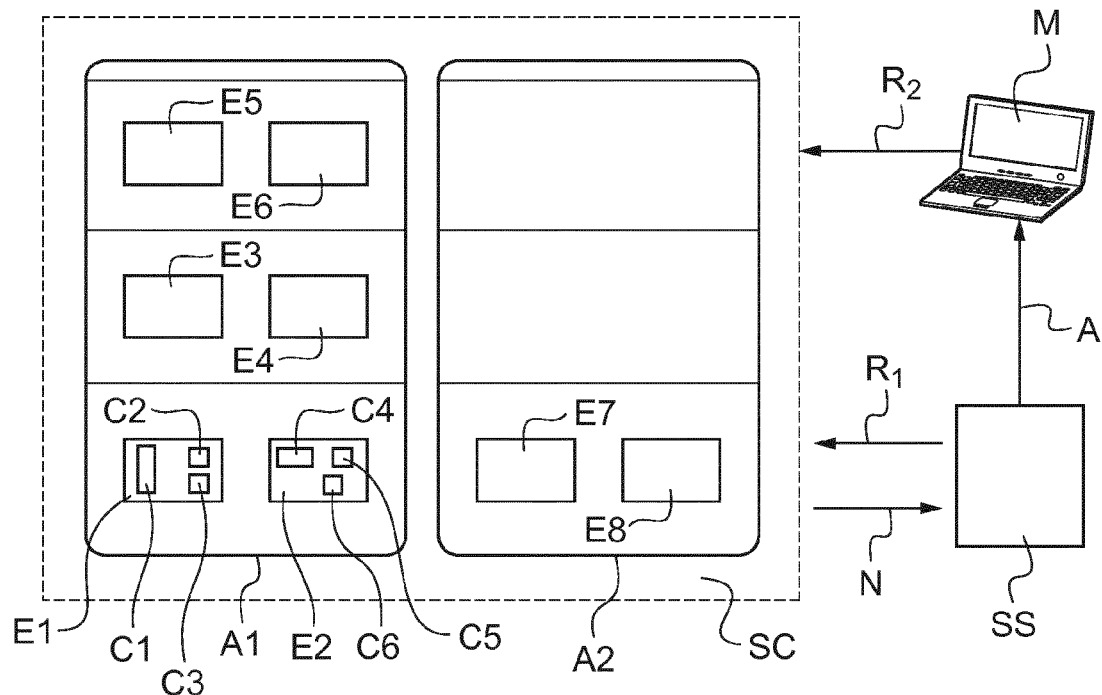

| | | | | |
|---|---|---|---|---|
| 2014/0047487 A1* | 2/2014 | Guedalia | ................ | H04W 4/70 |
| | | | | 725/80 |
| 2014/0222813 A1* | 8/2014 | Yang | ................ | G06F 17/30861 |
| | | | | 707/736 |
| 2015/0339346 A1* | 11/2015 | Berchtold | .............. | G05B 13/04 |
| | | | | 707/722 |

* cited by examiner

ARCHITECTURE FOR CORRELATING EVENTS FOR SUPERCOMPUTER SURVEILLANCE

CROSS-REFERENCE TO RELATED APPLICATIONS

This application is a National Phase application of International Application No. PCT/EP2015/060531, filed on May 12, 2015, which in turn claims priority to France Application No. 1454397, filed on May 16, 2014.

FIELD OF THE INVENTION

The invention relates to the field of computing centers, notably supercomputers. It more particularly relates to the monitoring of these supercomputers and of components and pieces of equipment of which they consist.

BACKGROUND OF THE INVENTION

A supercalculator (or supercomputer) is a computer designed for attaining the highest performances as possible with the known technologies upon its design, in particular in terms of computing rate. Supercomputers draw their superiority relatively to conventional computers both from the technology of the components used and their architecture.

Thus supercomputers have rates of several peta-flops and will soon attain exa-flops. The flops (for "FLoating point Operations Per Second") is a measurement unit commonly accepted for estimating the processing speed of a computer.

This architecture may notably be in a "pipeline" or parallel, in order to execute several tasks simultaneously. Regardless of the retained architecture, supercomputers contain a very large number of pieces of equipment themselves including a large number of components (memories, microprocessors, etc.)

Typically, each piece of equipment may send an informative message to a monitoring system as soon as one of its components or itself changes status. This type of message is commonly called an "event". This monitoring system has the mission of collecting and processing all these events and should react accordingly.

For example, when a piece of equipment sends in a given time lapse, a large number of temperature alerts, the monitoring service may have to make the decision of switching it off.

But alerts relating to a single problem may "make their way up" from different pieces of equipment (or components) and also be correlated at the monitoring system. This for example is the case if the whole of the components and/or pieces of equipment located at the top of the cabinets emit temperature alerts, possibly because of a problem of a cooling circuit. It is then important to trigger an alarm for the managers of the supercomputer.

The monitoring service may also supply a database for updating it with these thereby collected pieces of information and correlated. This database may then be used for more complex correlations, statistical calculations, etc.

In order to gain computing power, supercomputers become increasingly complex.

Accordingly, the number of events which may be generated within the supercomputer also increases. This point is all the more crucial since certain problems (for example affecting an area of a supercomputer, a cabinet, etc.) may generate chain events on a large number of pieces of equipment and components simultaneously or within a very short period of time.

Present solutions are based on one or several correlation engines but they already attain the limit of their possibilities. Certain monitoring systems deployed in the field show processing delays of several hours, which may cause a significant taking of risks for the computer (a major incident not reported in due time to the managers, etc.)

The research works and studies aiming at improving the situation essentially deal with the actual correlation engine, or with the adjunction of complementary modules for making the processing chain more efficient. However, the architecture designed around a correlation engine is not suitable for such scaling. The result of this is that only ad-hoc adaptations in the field have been able to be locally undertaken in order to minimize at best the problems of the unsuitability of the existing monitoring systems to the supercomputers.

SUMMARY OF THE INVENTION

The object of the present invention is to provide a monitoring system at least partly overcoming the afore mentioned drawbacks. More particularly, the invention is directed to providing a monitoring system which may adapt to supercomputers of various configurations, notably to "small" supercomputers, to "large" supercomputers and to supercomputers of next generations.

For this purpose, the present invention proposes a method for managing a supercomputer including a set of components comprising a step for generating notifications by sensors associated with said components; a step for processing said notifications with a hierarchy of modules, said notifications forming incoming events for the modules of the lowest hierarchical level of said hierarchy, and each module comprising at least one correlation engine for correlating incoming events and generating outgoing events transmitted to the modules of a higher level within said hierarchy as incoming events; a step for generating alarms, from outgoing events generated by the modules of the highest hierarchical level within said hierarchy.

For this purpose, the present invention also proposes a monitoring system of a supercomputer including a set of components and sensors associated with said components generating notifications; said monitoring system comprising a hierarchy of modules, each module comprising at least one correlation engine able to correlate incoming events and to generate outgoing events transmitted to the modules of a higher level within said hierarchy, as incoming events; wherein said sensors are provided for transmitting said notifications to modules of the lowest hierarchical level of said hierarchy as incoming events; the modules of the highest hierarchical level within said hierarchy are provided for generating alarms and transmitting them to a monitor.

According to preferred embodiments, the invention comprises one or several of the following features which may be used separately or as a partial combination with each other or as a complete combination with each other, with either one of the objects of the invention described earlier:

the management method further comprises a step for triggering a corrective action transmitted to said supercomputer.

said events are steered according to predefined criteria towards a correlation engine from among said at least one correlation engine.

said alarms are transmitted to a monitor having a man-machine interface.

a corrective action is transmitted by said monitor to said supercomputer.

a computer program which comprises instructions which, once loaded on an information processing system, are able to apply the method according to the invention.

the modules of a higher hierarchical level within said hierarchy are provided for triggering a corrective action and transmitting it to said supercomputer.

a module further comprises a filtering and steering functional block able to steer according to predefined criteria towards a correlation engine from among said at least one correlation engine.

at least some of said correlation engines are applied by a system of rules.

said modules are provided for communicating according to the "Syslog" protocol.

said notifications are transmitted according to the SNMP protocol.

a system which includes at least one supercomputer and a monitoring system according to the invention.

a system which includes at least one supercomputer, a monitoring system according to the invention and a monitor, said monitor being provided for receiving alarms from said monitoring system and for transmitting corrective actions towards said supercomputer.

Other features and advantages of the invention will become apparent upon reading the description which follows of a preferred embodiment of the invention, given as an example and with reference to the appended drawings.

SHORT DESCRIPTION OF THE DRAWINGS

FIG. 1 schematically illustrates a supercomputer.

Figure 2:
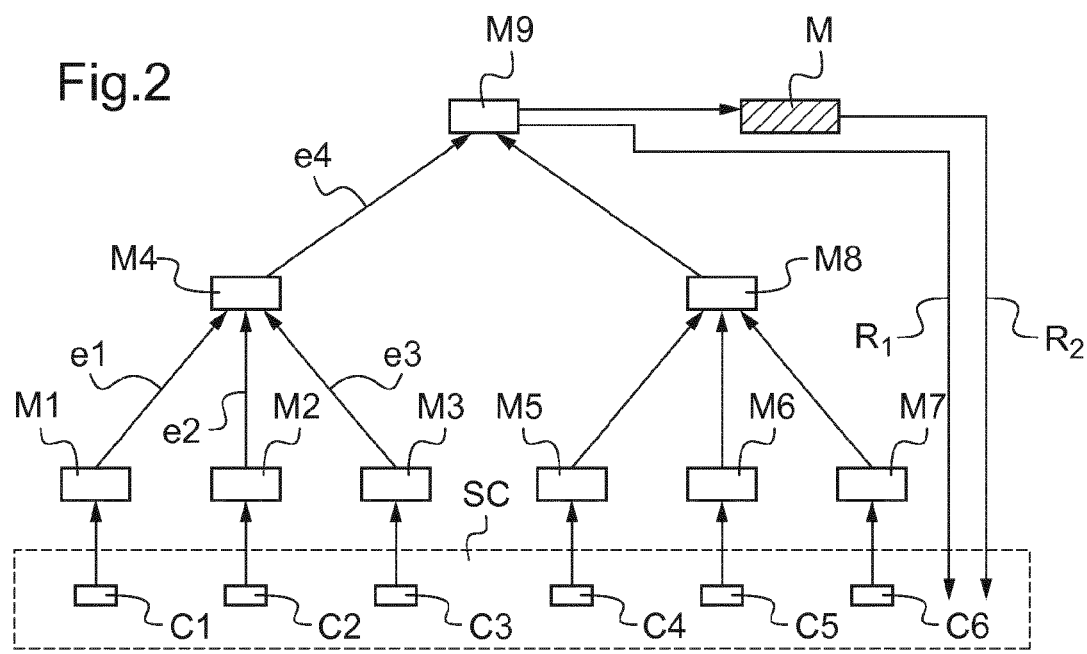

FIG. 2 schematically illustrates an example of a correlation module hierarchy, according to an embodiment of the invention.

Figure 3:
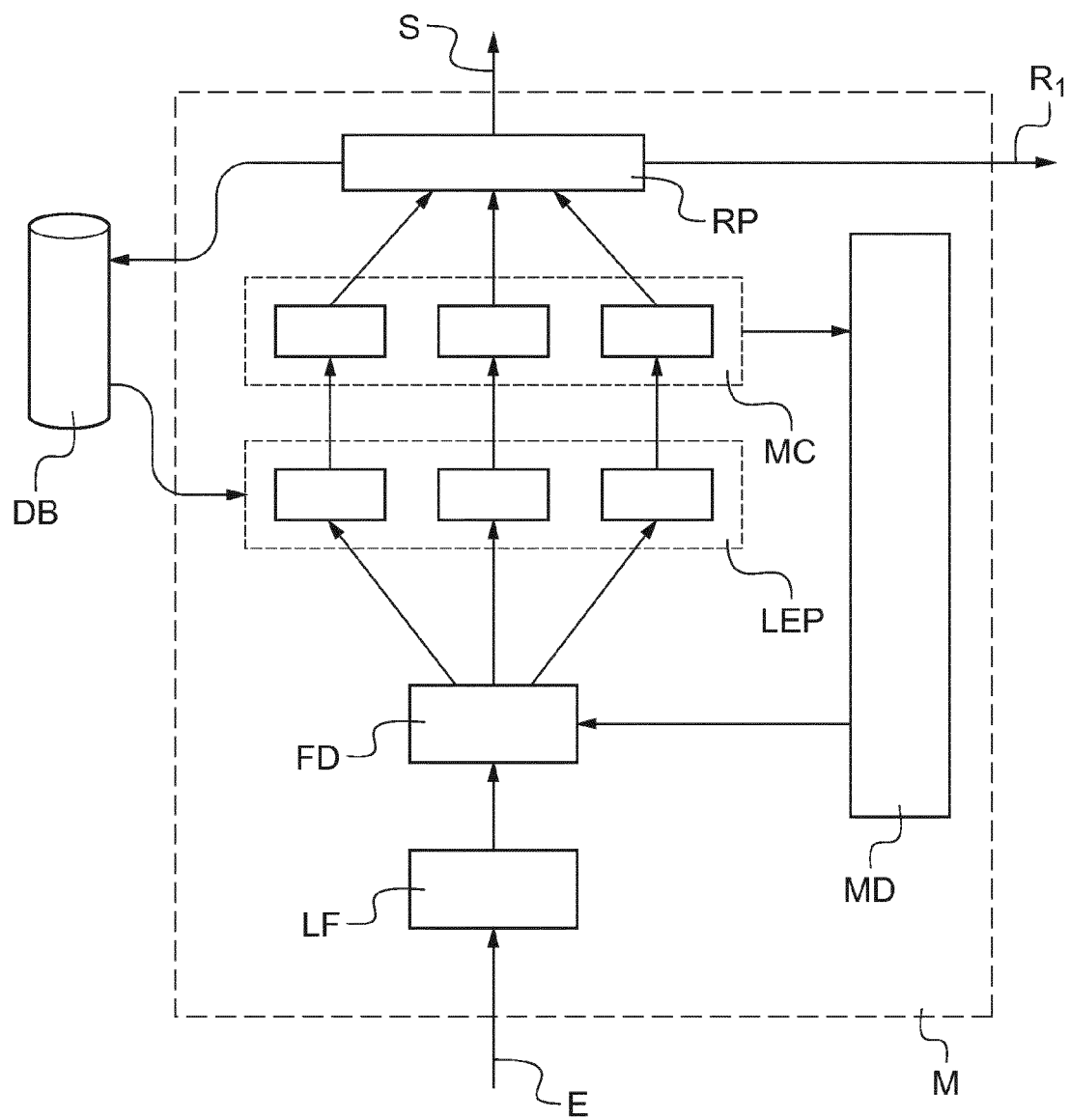

FIG. 3 schematically illustrates an example of a correlation module, according to an application of the invention.

DETAILED DESCRIPTION OF THE INVENTION

As illustrated in FIG. 1, a supercomputer SC or supercalculator may consist of several cabinets or "racks" A1, A2, in which are placed various pieces of equipment E1, E2, E3 . . . E8 in "drawers". Each piece of equipment itself generally consists of a large number of electronic components, C1, C2, C3 . . . C6.

In FIG. 1, exclusively the internal components of the pieces of equipment E1 and E2 are illustrated, for the sake of clarity, but it is obvious that the other pieces of equipment also consist of components. Also, the number of illustrated components and the number of pieces of equipment in each cabinet are indicated in the figure with a pure illustrative purpose: a supercomputer has a much larger number of components and pieces of equipment.

Sensors are associated with the components. One or several sensors may be provided for a same component. A same sensor may also be provided for several components. Thus, different association configurations between sensors and components may be provided.

Provision may also be made for having sensors at the pieces of equipment, or else forming groups of components or pieces of equipment which are associated with one or several sensors.

The sensors may be of different natures and capture different types of information: temperature, humidity level, electric consumption . . . but also information related to data processing: hardware errors, software errors, data traffic, etc.

These sensors are provided for generating notifications. These notifications may be "INFORM" messages of the SNMP (Simple Network Management Protocol) protocol, for example defined by STD 62 from the IETF (Internet Engineering Task Force). A "INFORM" message differs from a "TRAP" message in that the receiver of the message (here the module) acknowledges good reception of the message.

Generally, therefore, the sensor may send this message from an SNMP agent. It is received by a SNMPTRAPD "demon" and then processed by SMPTT and transmitted to a Syslog demon. The Syslog protocol will be described subsequently.

The notifications N are transmitted to the monitoring system SS, which may process them in order to optionally provide alarms A to a monitor M and/or trigger corrective action R1 towards the supercomputer SC. A corrective action R2 may also be triggered by the monitor M.

The monitor M may be a computer terminal such as a computer, a console, a tablet, a "smartphone", etc. which gives the possibility of providing a man-machine interface to human managers. Several monitors may be provided.

This interface gives the possibility of presenting to the managers the alarms A from the monitoring system, in a raw form, or under more advanced forms (statistical data, development calculations, etc.), on the one hand and to the managers triggering actions on the monitoring system SS and on the supercomputer SC on the other hand. These actions may be the search for additional information but also correction actions R2.

These corrective actions R1, R2, generated by the monitoring system SS or by the monitor M aim at partly or completely solving the problem(s) associated with the alarm A.

This resolution may in certain situations correct the source of the problem: thus, in the case of software errors, an update of the responsible piece of software may be triggered and completely solve the problem.

But, this may also be suppression of the symptoms of the problem without really suppressing the source: thus, in the case of alarms associated with a significant rise in temperature in a cabinet or a cabinet portion, the impacted components or pieces of equipment may be switched off. This is for avoiding any risk and damage for the supercomputer.

An alarm A is moreover triggered for the managers which may then undertake approaches required for really solving the problem (analysis of the cause, investigation in the field, etc.). It may also be possible to steer the alarms A towards a computer management system which is adapted for undertaking certain measures automatically.

Different implementations are therefore possible.

The monitoring system SS comprises a structure of modules M1, M2, M3 . . . M9. Each module may comprise at least one correlation engine able to correlate the incoming events and to generate outgoing events. Modules not including any correlation engine within the structure may further be provided.

In the example illustrated by FIG. 2, the structure is a hierarchy.

The outgoing events are transmitted to the modules of the upper hierarchical level within the hierarchy, for which they are considered as incoming events.

Thus, in FIG. 2, the module M4 has as incoming events e1, e2, e3, which are outgoing events respectively for the modules M1, M2, M3. Also, the outgoing event e4 is considered as an incoming event for module M9.

These modules may be distributed in various ways on a data processing platform consisting of several hardware or virtual machines. For example, a hierarchical level may be deployed on a given machine, or else several levels may be deployed on a same machine; or else further several modules of a same hierarchical level may be deployed on several machines, etc.

The hierarchy illustrated in FIG. 2 includes 3 hierarchical levels. Obviously this is an example and a monitoring system SS according to the invention may include an arbitrary number of hierarchical levels. This number of levels, as well as the number of modules for each level and the general architecture of the hierarchy may be configured by a user of the monitoring system SS.

This configuration may be carried out depending on the size and on the architecture of the supercomputer. It may also be adapted during the operation of the supercomputer, either for taking into account developments of the architecture of the latter, or for taking into account the results produced by the monitoring system SS: thus, if it is realized, during the operation, that the majority of the events stem from a certain area, then it may be useful to deploy more modules for this area, either by adding new modules, or by reassigning existent modules.

The sensors are provided for transmitting their notifications to the modules of lower hierarchical level, as incoming events. In the example of FIG. 2, the sensor associated with the component C1 transmits its notifications to the module M1, the sensor associated with a component C2 transmits its notifications to the module M2, and so forth up to the sensor associated with the component C6 which transmits its notifications to the module M7.

In this embodiment, the events stemming from the highest level of the hierarchical level may be considered as alarms, which are then transmitted to the monitor M. They may also be the subject of a preliminary processing operation in order to generate these alarms.

In the example illustrated in FIG. 2, the layer of higher level has a single module M9. This module M9 may transmit alarms A to a monitor M, as well as corrective actions R1 towards the supercomputer (not shown in FIG. 2).

It is however possible to imagine applications of the invention with several modules within the layer of higher level.

As this was stated earlier, according to the invention, each module comprises at least one correlation engine for correlating incoming events and generating outgoing events.

Thus, as illustrated by FIG. 3, the modules may further include other functions which may be being preprocessed or post-processed relatively to the correlation engine MC.

Each module of the hierarchy may include different functions, and different applications of each function.

According to a possible embodiment, the modules of a same hierarchical level are similar (same functions, same implementations of the functions), but other embodiments are possible according to which even within a same hierarchical level, the modules may have different functions and for common functions, different applications.

The incoming events E may be outgoing events of another module (of a hierarchical level immediately lower), or else notifications from a sensor.

In this second case, the notifications may be according to the SNMP protocol, and notably be "INFORM" messages as described earlier. They may further be compliant with the "Syslog" protocol defined by RFC 5424 from the IETF.

The events transmitted between modules of the monitoring system may be compliant with various standardized or "proprietary" protocols. They may also be compliant with this same "Syslog" protocol.

Anyway, this may be direct communication between the modules, without setting into place a "Syslog file", so that the communications are accelerated and the addition of modules may be configured in a very simple and immediate way by a manager.

The incoming event E may first of all be processed by a functional formatting block LF. This function aims at rearranging and optionally completing the incoming event, and notably specifying its criticality level, formatting the contents of the event according to predefined schemes, etc. This treatment gives the possibility of facilitating the subsequent processing operations.

The event is then transmitted to a filtering and distribution FD functional block.

This function gives the possibility of steering the events according to predefined criteria to different parts within the module, notably towards different correlation engines.

The criteria may be diverse. For example, this may be having specialized correlation engines for processing given types of events (for example, events relating to temperature). Thus, the predefined criteria give the possibility of steering each event towards the suitable correlation engine.

It may also be possible to carry out the load distribution, by steering the events towards a less loaded correlation engine. The determination of the less loaded correlation engine may be accomplished in different ways: by a load measurement periodically from the correlation engines, by an estimation depending on statistics on the incoming events distributed beforehand, etc. A monitoring device MD may be responsible for establishing pieces of information on the load of the various correlation engines and of taking them up towards the filtering and steering functional block FD.

The filtering and distribution functional block FD also gives the possibility of filtering the incoming events.

This filtering may have the goal of limiting risks of avalanches. Indeed, certain malfunctions of the supercomputer may cause chain reactions and/or a very large number of notifications from components. For example, a failure of the ventilation system may cause notifications from the actual ventilation system, and then an increasing number of notifications coming from computing components as the temperature increases, etc. These phenomena may in certain cases completely congest a monitoring system and therefore prevent or slow down the resolution of the problem.

The filtering gives the possibility of selecting a reduced number of incoming events visibly related to a same cause, in order to unload the correlation engines from the involved load. Further it gives the possibility of only keeping in the processing events having a certain criticality. Thus, those representing a lower information level may be discarded in order to promote events with more priority (having a higher criticality).

The incoming events may then be transmitted to a pre-processing functional block LEP.

This block has the purpose of completing, if necessary, the event with additional pieces of information. These additional pieces of information may be connected in different ways and may depend on the implementation of the correlation engine. In so far that the correlation engines contained in the module may be specialized and therefore be the subject of different implementations, these preprocessing functional blocks LEP may be adapted to each correlation engine. Also, in the example of FIG. 3, 3 correlation engines are illustrated therefore with 3 preprocessing functional blocks.

Next, the events are transmitted to the correlation engine MC corresponding to the preprocessing functional block LEP.

As this was stated earlier, each correlation engine may be the subject of a different implementation. This implementation may be adapted to specialization of the correlation engine for processing a type of particular events. The MC module may also only contain a single unique correlation engine.

The correlation engines may be distributed over several hardware machines, in order to run in parallel and distribute at best the processing load. It is also possible to deploy several modules M within a same hardware or virtual machine.

These selections of architecture and of deployment should be subject of a decision by a monitoring system manager. But it should be noted that such a monitoring system according to the invention is not set and may be modified a posteriori. It may be modified because of developments brought to the supervised supercomputer, but also from pieces of information on the history of the supervision: the manager may thus realize that certain malfunctions are not handled in an optimal way and make the decision of modifying the monitoring system in order to better take them into account for the future.

The correlation engine(s) then transmit(s) the event to a block for processing results RP. This block aims at elaborating and shaping an outgoing event. Optionally it is possible here to set into place a protocol adaptation in order to allow interoperability with the modules or other devices.

This block for processing results may also be provided for transmitting a corrective action R1 towards the supervised supercomputer, as this was described earlier.

This block for processing the results may also trigger a storage in memory of the event in a database which may be common to the whole of the modules of the monitoring system. This database DB gives the possibility of keeping a history ("log" of the various processed events, in order to be able to refer thereto for processing new events (with the functional preprocessing block LEP, notably). It may also be used by an external device, for example the monitor (described with reference to FIG. 2) in order to carry out statistics or else for obtaining more specific pieces of information on a received alarm.

The correlation engines may apply different technologies. The applied technology may depend on the choice of the manager according to his/her expertise and his/her knowledge of the supercomputer. It may also depend on considerations of costs, or performance of the engines on the market at the moment of the choice. It may also be adapted to the type of processed events in the case of a specialist of correlation engines.

Regardless of the technology used, a strong constraint for a correlation engine is to allow a rapid and relevant result. Rapidity is important so as to allow rapid reaction on the detected problem (either automatically or manually). The relevance implies minimization of false alerts and especially, detecting a maximum of relevant events, i.e. revealing a problem on the supervised supercomputer.

Many technologies have been developed for applying correlation engines. Mention may be made of 3 large families of technologies, each coming in many alternatives and implementations.

A first family of technology is based on rules ("rule-based systems"). These are probably the most current technologies. They consist of trying to match incoming events with rules, stored in a base of rules. In the case of a match, the rule is inferred therefrom and conclusions may be established. These conclusions may consist in the transmission of a new event, in the triggering of a corrective action, of a processing operation, etc.

From among the implementations of these technologies, mention may be made of the system SEC ("Simple Event Correlator"), JRules, Kazimir, etc.

Another family of technologies is called "codebook". This is somewhat an alternative of rule-based technologies, but instead of considering the events individually, the latter are aggregated in vectors and the vectors are compared with matrices containing signature associated with different posed problems. The goal is to search for the primary cause of a set of events (notifications) from the supervised supercomputer.

Another family makes use of artificial intelligence techniques: these may be bayesian networks, expert systems, etc. or combinations of these techniques.

One of the advantages of the invention is its flexibility.

The monitoring system SS is thus very open and gives the possibility of devising and setting into place different structures, in order to potentially meet a maximum of needs, mainly depending on the size of the supercomputers but also on the technologies required for their supervision.

From the point of view of implementation, this model may be considered as a platform with "plugins". Thus, the elements may be inter-changed, extended . . . without affecting the core of the platform. The extensions may only be made on specific and particular sub-sets, if such is the need. Also, an architecture may change overtime, by following the developments of the supercomputers, without having to wipe out the present solution. The maintenance and development costs are thereby reduced.

Of course, the present invention is not limited to the examples and to the embodiment described and illustrated, but it may have many alternatives accessible to one skilled in the art.

The invention claimed is:

1. A method for managing a supercomputer including a set of supercomputer components, the method comprising:
sensing a status of said supercomputer components by a plurality of sensors, and generating notifications regarding the status;
processing said notifications with a hierarchy of modules, said notifications forming incoming events for the modules of the lowest hierarchical level of said hierarchy, and each module comprising at least one correlation engine for correlating incoming events and generating outgoing events transmitted to the modules of a higher level within said hierarchy as incoming events, said events steered according to predefined criteria towards a correlation engine from among said at least one correlation engine;
generating alarms (A), from outgoing events generated by the modules of the highest hierarchical level within said hierarchy.

2. The method according to claim 1, further comprising a step for triggering a corrective action transmitted to said supercomputer.

3. The method according to claim 1, wherein said alarms are transmitted to a monitor having a man-machine interface.

4. The method according to claim 1, wherein a corrective action (R2) is transmitted by a monitor to said supercomputer (SC).

5. A computer program comprising instructions which, once loaded on an information processing system, are able to apply a method for managing a supercomputer including a set of supercomputer components, the method comprising:
   sensing a status of said supercomputer components by a plurality of sensors, and generating notifications regarding the status;
   processing said notifications with a hierarchy of modules, said notifications forming incoming events for the modules of the lowest hierarchical level of said hierarchy, and each module comprising at least one correlation engine for correlating incoming events and generating outgoing events transmitted to the modules of a higher level within said hierarchy as incoming events, said events steered according to predefined criteria towards a correlation engine from among said at least one correlation engine; and
   generating alarms (A), from outgoing events generated by the modules of the highest hierarchical level within said hierarchy.

6. A monitoring system of a supercomputer including a set of supercomputer components and a plurality of sensors sensing a status of said supercomputer components, and generating notifications regarding the status; said monitoring system comprising a hierarchy of modules, each module comprising at least one correlation engine able to correlate incoming events and to generate outgoing events transmitted to the modules of a higher level within said hierarchy, as incoming events; wherein said sensors are configured for transmitting said notifications to modules of the lowest hierarchical level of said hierarchy as incoming events; wherein a module further comprises a filtering and steering functional block able to steer according to predefined criteria towards a correlation engine from among said at least one correlation engine; and wherein the modules of the highest hierarchical level within said hierarchy are configured for generating alarms and transmitting them to a monitor.

7. The monitoring system according to claim 6, wherein the modules of higher hierarchical level within said hierarchy are provided for triggering a corrective action and transmitting it to said supercomputer.

8. The monitoring system according to claim 6, wherein at least some of said correlation engines are applied by a system of rules.

9. The monitoring system according to claim 6, wherein said modules are provided for communicating with according to the "Syslog" protocol.

10. The monitoring system according to claim 6, wherein said notifications are adapted so as to be transmitted according to the SNMP protocol.

11. A system including at least one supercomputer and a monitoring system including a set of supercomputer components and a plurality of sensors sensing a status of said supercomputer components and generating notifications regarding the status; said monitoring system comprising a hierarchy of modules, each module comprising at least one correlation engine able to correlate incoming events and to generate outgoing events transmitted to the modules of a higher level within said hierarchy, as incoming events; wherein said sensors are configured for transmitting said notifications to modules of the lowest hierarchical level of said hierarchy as incoming events; wherein a module further comprises a filtering and steering functional block able to steer according to predefined criteria towards a correlation engine from among said at least one correlation engine; and wherein the modules of the highest hierarchical level within said hierarchy are configured for generating alarms and transmitting them to a monitor.

12. A system according to claim 11, further including a monitor, said monitor being provided for receiving alarms from said monitoring system and for transmitting corrective actions towards said supercomputer.

* * * * *